United States Patent [19]
Hori et al.

[11] 3,950,605
[45] Apr. 13, 1976

[54] METAL FOIL-PLASTIC LAMINATE AND METHOD OF PREPARING THE SAME

[75] Inventors: Yutaka Hori; Zenzo Honda; Kenji Suzuki; Keiji Nakamoto; Yoshiharu Yamamoto, all of Toyohashi, Japan

[73] Assignee: Nitto Electric Industrial Co., Ltd., Ibaraki, Japan

[22] Filed: Aug. 13, 1973

[21] Appl. No.: 387,971

Related U.S. Application Data

[62] Division of Ser. No. 95,742, Dec. 7, 1970, abandoned.

[30] Foreign Application Priority Data

Dec. 30, 1971 Japan............................ 44-116052
Dec. 30, 1971 Japan............................ 45-39480

[52] U.S. Cl............. 174/107; 428/216; 428/458; 428/462; 428/517; 428/520
[51] Int. Cl.²............................................ H01B 7/18
[58] Field of Search.......... 161/214, 217, 218, 253, 161/254; 174/102 C, 107, 110 PM; 428/215, 216, 458, 461, 462, 516, 517, 519, 520

[56] References Cited
UNITED STATES PATENTS

| | | | |
|---|---|---|---|
| 2,406,039 | 8/1946 | Roedel | 117/132 C |
| 3,340,091 | 9/1967 | Zweig | 161/252 |
| 3,586,756 | 6/1971 | Garner | 174/107 |
| 3,607,614 | 9/1971 | MacKay et al. | 161/218 |
| 3,616,191 | 10/1971 | Fuerholzer | 161/218 |
| 3,637,428 | 1/1972 | Aleckner | 428/516 |
| 3,698,934 | 10/1972 | Eichhorn et al. | 161/254 |
| 3,719,769 | 3/1973 | Miyauchi et al. | 174/110 PM |

*Primary Examiner*—William J. Van Balen
*Assistant Examiner*—William R. Dixon, Jr.
*Attorney, Agent, or Firm*—Sughrue, Rothwell, Mion, Zinn & Macpeak

[57] ABSTRACT

A metal foil-plastic laminate comprising an upper layer of a member selected from the group consisting of a polyethylene-vinyl acetate and ethylene-vinyl acetate copolymer containing no more than 8 wt. % of vinyl acetate and a lower layer of an ethylene-vinyl acetate copolymer containing 10–45 wt. % of vinyl acetate, thermally pressed on at least one surface of a metal foil, said lower layer being in contact with the metal foil and method for preparing the same.

6 Claims, 4 Drawing Figures

INVENTORS
YUTAKA HORI
ZENZO HONDA
KENJI SUZUKI
KEIJI NAKAMOTO
YOSHIHARU YAMAMOTO

BY Sughrue, Rothwell, Mion,
Zinn & Macpeak
ATTORNEYS

3,950,605

METAL FOIL-PLASTIC LAMINATE AND METHOD OF PREPARING THE SAME

This is a Division of application Ser. No. 95,742, filed Dec. 7, 1970, now abandoned.

FIELD OF THE INVENTION

The present invention relates to a metal foil-plastic laminated film, which has excellent properties as a coating material and particularly, for communicating cables as an electrostatic shielding layer or mositure-proof layer, as well as a method for producing the same.

DESCRIPTION OF THE PRIOR ART

Recently, stringent requirements have been imposed upon the properties of communication cables. For example, there is demand to improve the water-resisting property of underground distributing cables, and to provide a shielding layer active against thunderstrokes, electric inductions, etc. For this purpose, a metal foil laminated tape has been employed which is composed of adhered polyethylene tape and aluminum foil. However, since the adhesive property between the aluminum foil and the polyethylene layer is poor, peeling is produced between both layers when the cable is bent. As a result, the aluminum foil is broken, and deteriorates the shielding effect. Furthermore, due to the poor adhesive property between the aluminum foil and the outer polyethylene, the same drawback as mentioned above is exhibited.

SUMMARY OF THE INVENTION

Therefore, the object of the present invention is to provide a metal foil-plastic laminated film, which has an excellent adhesive property between the plastic and metal foil, as well as excellent anti-shock properties and bending properties.

Another object of the present invention is to provide a method of producing the aforementioned laminated film.

The inventors, after many investigations, have found that favorable results are obtained in a composite film made of two layers of plastic films being bonded or adhered together instead of an external polyethylene layer. However, when different kinds of plastics have been pasted together, various problems arise, such as deterioration of shock resistance at low temperature. In addition, the development thereof was found to be difficult. The present invention, however, obviates the difficulties of the prior art.

Accordingly, the present invention resides in a metal foil-plastic laminated film which is obtained by thermally pressing a composite film, produced by thermally welding a polyethylene or an ethylene-vinyl acetate copolymer containing not more than 8 wt. % of vinyl acetate (upper layer) and ethylene-vinyl acetate copolymer containing 10–45 wt. % of vinyl acetate (lower layer), on at least one surface of a metal foil, the latter copolymer being in contact with the metal foil.

When the content of the vinyl acetate in the copolymer in the upper layer is more than 8 wt. %, the adhesion with polyethylene is deteriorated, and when the content of vinyl acetate in the lower layer is less than 10 wt. %, the adhesion with the metal foil is deteriorated. When it is more than 45 wt. %, the molding characteristic is diminished significantly.

BRIEF DESCRIPTION OF THE DRAWINGS

A brief description will be given in the following with respect to the drawings, in which.

Illustrative of the metal which can be utilized in this invention are aluminum, copper, iron, steel, silver, gold, tin, etc. Aluminum and copper, however, are preferred.

The method of producing the laminated film of the present invention will now be described. The composite plastic film employed in the present invention will be produced by a method of producing double inflation film. That is, by (a) communicating tip ends of two extruders with one inflation die, and thermally welding the flow of two plastic layers directly in front of or directly at the back of the die exit so as to obtain a two-layer tube, and (b) cutting and opening one end or both ends of the tube, or connecting tip ends of two extruders to one T-die, thus obtaining a two-layer film. Furthermore, in the present invention, when single or both surfaces are treated for welding by known chemical treatment, and especially by corona discharge, the adhesive power with the polyethylene outer jacket becomes stronger than expected when it is made of metal foil and other coverings common to communicating cable. The composite film thus obtained is thermally pressed on a metal foil. The thermal pressing is effected by heating the film until it is softened and pressing on a metal foil heated to a range of from 80° – 250° C with a pressure of 0.1 – 10 kg/cm$^2$.

The thickness of the metal foil-plastic laminated film according to the present invention can be varied according to the use thereof. For example, when it is used for communication cable, a thickness of the metal foil of from 10 to 800 microns, and a thickness of the plastic layer of from 10 to 600 microns, are appropriate. A thickness of the overall metal foil-plastic laminated film of from 2 to 1400 microns is desirable.

DETAILED DESCRIPTION OF THE DRAWINGS

The method of producing the film will now be described by reference to the drawings.

Figure 1:
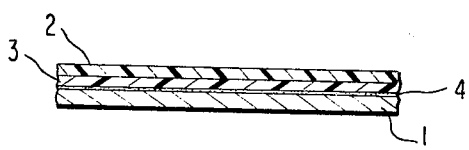
FIGS. 1 and 2 are sectional views showing laminated films according to the present invention, wherein the plastic film is laminated on single surface of a metal foil.

FIG. 1 is a cross-sectional view of a metal foil-plastic laminated film produced by thermally pressing a corona treated single surface 4 of composite plastic film formed by a polyethylene or ethylene-vinyl acetate copolymer 2 containing 8 wt. % of vinyl acetate and an ethylene-vinyl acetate copolymer 3 containing 10–45 wt. % of vinyl acetate on one surface of a metal foil 1.

Figure 2:
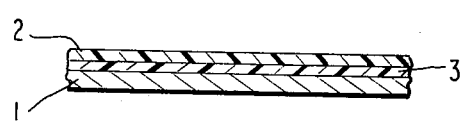
Figure 3:
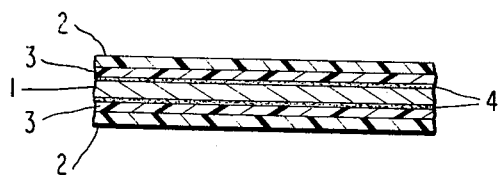
FIG. 3 is a similar view of a laminated film in which the plastic film is laminated on both surfaces of a metal foil.
Figure 4:
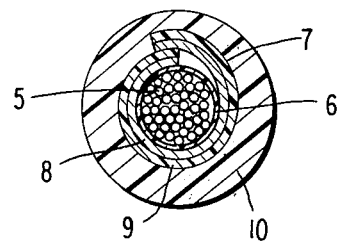
FIG. 4 is a cross-section showing the laminated film of the present invention utilized as a shielding layer for a communicating cable.

FIG. 2 is a cross-sectional view wherein the composite plastic film is thermally pressed on the metal foil without the corona-treated layer 4 shown in FIG. 1. FIG. 3 is the same as FIG. 1 but the film is laminated on both surfaces with metal foil. FIG. 4 is a sectional view of an example in which the film of the present invention is used in a communication cable as the water-resisting and shield layer, wherein the numeral 5 designates a collected core, 6 is a bundling tape such as polyester film, polyethylene film, etc., 7 is the film according to the present invention, the metal foil 8 being disposed along the side of the bundling tape 7, and an outer jacket 10 made of polyethylene is disposed on the side of the plastic film 9 of the present invention.

The metal foil-plastic laminated film according to the present invention has excellent adhesive power between the two kinds of polymers employed as well as between the plastic film and the metal foil. Since the polymer of the upper layer has good adhesion with polyethylene, the laminated film of the present invention is capable of being used for a shielding layer of a communication cable, and by producing the polyethylene jacket on the outer side, a highly satisfactory communication cable is obtained.

Since the film has excellent resistances against cold weather and bending beyond expectation, it can be used not only for communication cable, but also for the outer covering of condenser, as insulating water-resisting layer or packing material.

A better understanding of the present invention will be attained from the following examples which are merely intended to be illustrative and not limitative of the present invention.

EXPERIMENTAL EXAMPLE

Before showing embodimental examples of the present invention, a description will be given on the content of vinyl acetate. The adhesion is measured between the adhered surfaces of a composite film obtained by laminating an ethylene-vinyl acetate copolymer 10 cm. wide, 50 cm. long and 0.05 cm. thick, containing vinyl acetate in an amount shown in Table 1, and a soft aluminum foil 10 cm. wide, 50 cm. long and 0.2 mm. thick, with a 5 kg-load roller in a hot-air drying machine at 180°C (Method A). On the other hand, polyethylene (made by Nittounica Co., 0506), 2 mm. thick, is laminated on the same tape, and heated in a hot-air drying machine at 180°C for 10 minutes. It is then sealed by one reciprocation with a 5 kg-load roller in the vessel and then the adhesion between the adhered surfaces is measured (Method B). The measurement is effected by a 180° peeling or tearing test at a pulling speed of 200 mm/min. at 20°C, respectively.

TABLE 1

| Ethylene-vinyl acetate copolymer, content of vinyl acetate (wt %) | Adhesion A (g/cm) | Adhesion B (g/cm) |
|---|---|---|
| 0 | 40 | 3,800 |
| 3 | 120 | 3,650 |
| 5 | 400 | 3,600 |
| 8 | 530 | 3,500 |
| 14 | 770 | 3,000 |
| 19 | 780 | 2,700 |
| 28 | 800 | 2,500 |
| 33 | 780 | 2,000 |
| 45 | 650 | 1,800 |

As is evident from Table 1, a polyethylene-vinyl acetate or ethylene-vinyl acetate copolymer containing 0–8 wt. % of vinyl acetate has excellent adhesion with polyethylene, but it has a poor adhesion with metal foil; on the other hand, ethylene-vinyl acetate copolymer containing 14–45 wt. % of vinyl acetate has excellent adhesion with metal foil, but poor adhesion with polyethylene. Accordingly, the present invention, the characteristics of both components are combined skillfully. Hence, the composite plastic film is adhered to the metal foil, with one side thereof, which is made of the ethylene-vinyl acetate copolymer containing 10–45 wt. % of vinyl acetate, having excellent adhesion to the metal foil, facing the metal foil. As a result, when the material to be adhered is polyethylene, the adhering material which is the layer of polyethylene or ethylene-vinyl acetate copolymer containing less than 8 wt. % of vinyl acetate has an excellent adhesion with polyethylene. Hence, perfect adhesion is obtained. Furthermore, since the adhesion between the two layers of composite plastic film is effected by thermal welding, it is difficult to peel off and separate them.

EXAMPLE 1

A plastic material shown in Table 2 is produced by means of said extruder, and the adhesion shown in foregoing examples is measured. The result obtained is shown in Table 2.

The composite film consisting of two kinds of plastics is prepared by extrusion while heating each of the tapes above their respective softening points, and further heating them at the die opening at temperatures higher than 10°–50°C. The ratio of thickness of two layers is 50% – 50%, the thickness of the composite film is 50 microns, and the quantity of extrusion is 0.1 – 10 kg/hr. As for the aluminum foil and the thermal pressing thereof, the same data may be applied as in the experimental example.

Table 2

| Composite Plastic Film | | | | Adhesion A (g/cm) | Adhesion B (g/cm) |
|---|---|---|---|---|---|
| Upper layer Composition | VAc %* | Lower layer (metal foil side) Composition | VAc %* | | |
| Mitsui Polychemical Co. Trade name EVAFLEX No. 660, M.I. 2.0 | 8 | Beyer Co., Germany, Trade name REVAPLAN No. 450, M.I. 1.5 | 45 | 850 | 3,300 |
| " | 8 | Mitsui Polychemical Co., Trade name EVAFLEX No. 260, M.I. 6.0 | 28 | 830 | 3,500 |
| " | 8 | Sumitomo Kagakukogyo Co. Trade name EVATET H2011 | 15 | 795 | 3,500 |
| Mitsui Polychemical Co. Trade name MIRASON | almost zero | EVAFLEX No. 560 M.I. 3.5 | 14 | 790 | 3,700 |

Table 2-continued

| Composite Plastic Film | | | | Adhesion A (g/cm) | Adhesion B (g/cm) |
|---|---|---|---|---|---|
| Upper layer Composition | VAc %* | Lower layer (metal foil side) Composition | VAc %* | | |
| 12 Mitsubishi Yuka Co. Trade name UCALON 10F M.I. 1.2 | 5 | " | 14 | 770 | 3,400 |
| Sumitomo Kagaku-kogyo Co. Trade name EVATET M.I. 2.2 | 5 | " | 14 | 760 | 3,500 |

*VAc % shows weight % of vinyl acetate,
M.I. shows Melt Index (measured by ASTM-D. 1238).

As shown in Table 2, the product of the present invention exhibits excellent adhesion with metal foil as well as polyethylene as the material to be adhered.

EXAMPLE 2

In Example 1, it has been shown that the adhesion obtained by the present invention is excellent. In addition, the laminate is not only excellent in adhesion, but also in resistance during cold weather or against bending. This is evident from the following example:

TABLE 2

| | Cold weather crack resistance | Adhesion with polyethylene layer (kg/10 mm) | Bending resistance (turns) |
|---|---|---|---|
| Comparison example 1 | cracked | 3.0 | 50 |
| Comparison example 2 | no change | 1.5 | 34 |
| Embodimental example 2 | no change | 3.8 | 76 |

In comparison Example 1, a polyethylene film having a thickness of 0.05 mm is thermally pressed on a single surface of soft aluminum foil, 0.2 mm thick.

In comparison Example 2, an ethylene-vinyl acetate copolymer film containing 2.8 wt. % of vinyl acetate and 0.05 mm thick is thermally pressed on a single surface of the same aluminum foil.

In Example 2, a plastic film 0.05 mm thick, is thermally pressed on a single surface of the same aluminum foil. Said plastic film is composed of an ethylene-vinyl acetate, copolymer layer containing 5 wt. % of vinyl acetate (Mitsubishi Yuka Co., trade name: UCALON 10F) for one surface, and an ethylene-vinyl acetate copolymer layer containing 28 wt. % of vinyl acetate (Mit sui Polychemical Co., trade name: EVAFLEX No. 260) for the other surface, the latter layer contacting the aluminum foil.

By cold weather crack resistance is meant to determine the crack property of a jacket of a cable having a radius of 15 mm. This jacket is prepared by bundling over a collected core of conductors with an emboss of polyethylene bundling tape, 0.05 mm thick, then wrapping it with said metal foil-plastic laminated film having a tape-form longitudinally with the aluminum foil internally, and finally covering with polyethylene outer jacket made by Nittounica Co. 0506 having 3 mm thickness. The test is carried out by dropping an iron roll weighing 1 pound from a height of 3 feet on the cable in a thermostatic chamber maintained at −30°C.

Adhesion with aluminum foil is measured by the method described in the experimental example.

In the bending characteristic test, the number of turns is measured until the aluminum foil is broken by bending the cable on a metal mandrel having a radius six times that of the cable.

As shown in Table 2, the outer jacket and the aluminum foil of the composite tape according to the present invention are perfectly integrated through the composite film, so that it has an excellent characteristic both in bending and in cold-weather crack resistances.

Although the present invention has been adequately described in the foregoing specification and examples included therein, it is readily apparent that various changes and modifications may be made without departing from the scope thereof.

What is claimed is:

1. A plastic jacketed cable having a covering layer on the outside of an aggregated conductive core and provided with a polyethylene plastic jacket on the outer surface thereof, said covering layer comprising a metallic foil-plastic laminate comprising an upper layer of ethylene - vinyl acetate copolymer containing 3 to 8 wt % of vinyl acetate and a lower layer of an ethylene - vinyl acetate copolymer containing 10 – 45 wt % of vinyl acetate, said lower layer being thermally pressed in contact with the metal foil and said upper layer is adhered to said plastic.

2. A plastic cable as claimed in claim 1 where the metal foil plastic laminate is 2–1400 $\mu$ thick.

3. A plastic cable as claimed in claim 2 where the metal foil is 10–800 $\mu$ thick and the plastic is 10–600 $\mu$ thick.

4. A plastic cable as claimed in claim 2 where the metal foil is a member selected from the group consisting of aluminum, copper, iron, steel, gold or tin.

5. A plastic cable as claimed in claim 4 where the metal foil is aluminum.

6. A plastic cable as claimed in claim 4 where the metal foil is copper.

* * * * *